Nov. 14, 1961     C. L. MILES     3,008,577
LENS TESTER AND SORTER
Filed Jan. 27, 1958     4 Sheets-Sheet 1
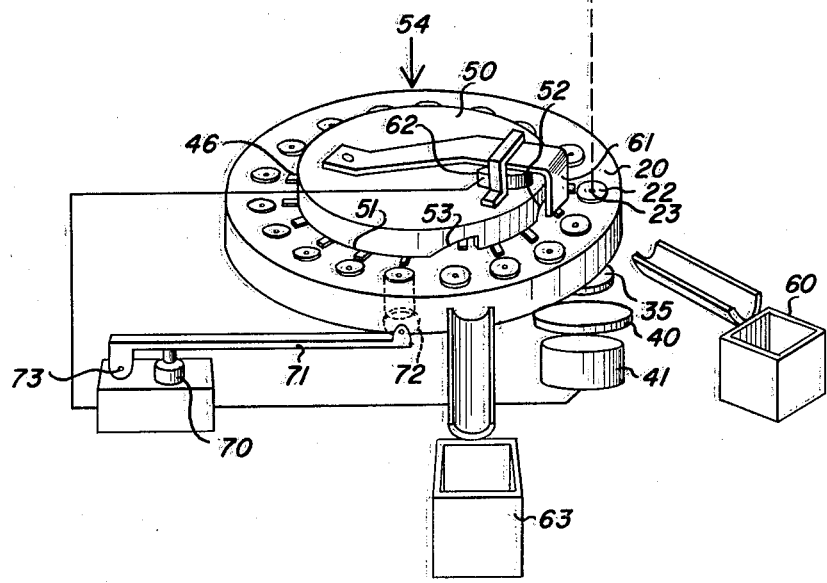
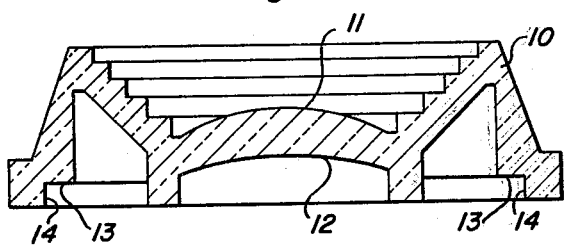
CLIFFORD L. MILES
INVENTOR.
BY R. Frank Smith
    F. M. Emerson Holmes
                  ATTORNEYS

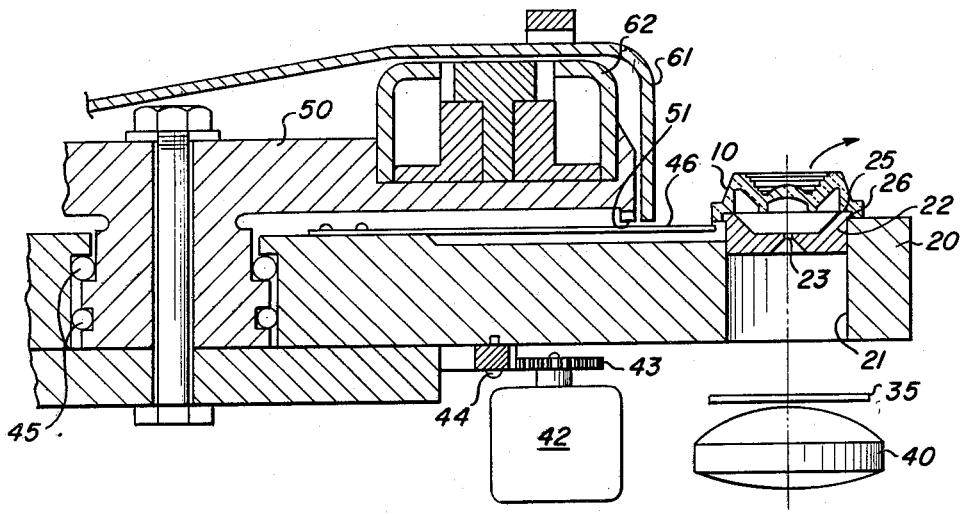
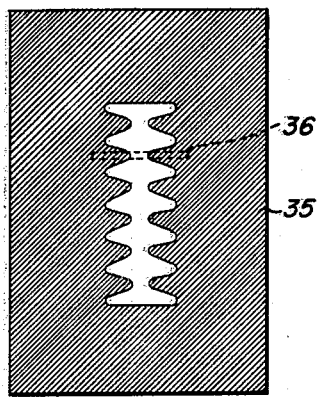

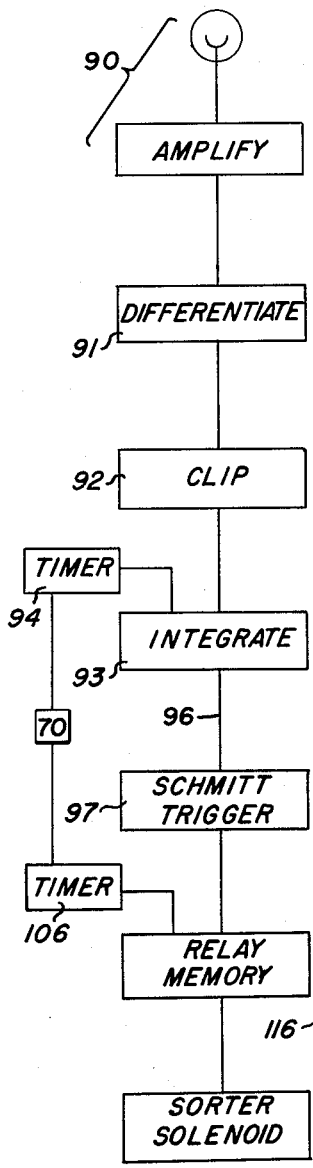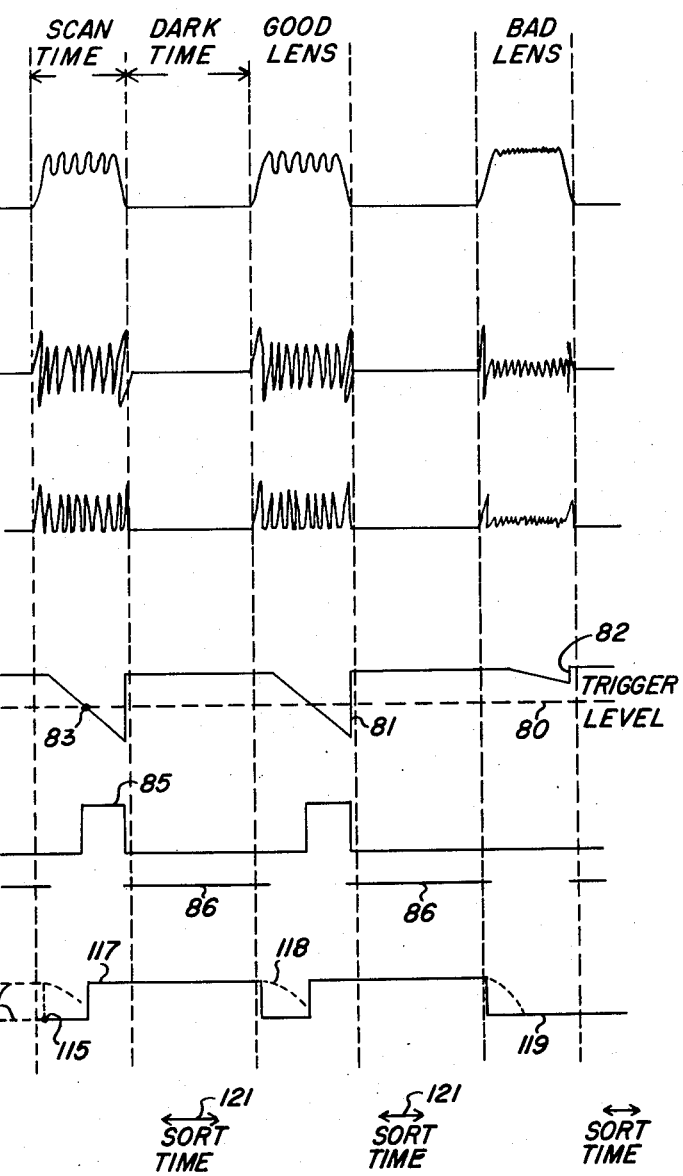

United States Patent Office 3,008,577
Patented Nov. 14, 1961

3,008,577
LENS TESTER AND SORTER
Clifford L. Miles, Rochester, N.Y., assignor to Eastman Kodak Company, Rochester, N.Y., a corporation of New Jersey
Filed Jan. 27, 1958, Ser. No. 711,413
5 Claims. (Cl. 209—74)

This invention relates to a method and means for testing and sorting lenses.

It is particularly suitable for production inspection of large quantities of relatively inexpensive lenses such as single element lenses. The lenses may be in a mount, molded integrally with a mount or separate.

It is an object of the invention to provide a method of and apparatus for sorting lenses according to their image producing quality. It is an object of a preferred embodiment of the invention to sort lenses according to the focal length of each lens measured from an axial control mounting surface on the lens or its mount, secondly according to the optical centering of the lens relative to a second control surface on the lens or mount and thirdly according to any of the other factors such as aberration and flaws, which affect the image quality. Thus it is an object of the invention to provide a reliable means for sorting lenses according to their focal lengths and for rejecting any lens whose focal lengths differ from the acceptable value by more than a certain tolerance or whose optical quality or decentering is such that it gives a low quality image.

It is also an object of the invention to provide a sorting arrangement which will reject all lenses is there is a failure in the control system of the sorter. Thus the essential object of the invention is to provide reliable, high speed sorting of lenses according to a criterion based directly on the quality of the image produced by the lens in the plane in which the image is supposed to be formed, for example in the plane of the film when the lens is to be used in a camera.

According to the invention a line source of light, either in filament or an illuminated slit, directs light through a test area. A lens to be tested is moved through this test area in a plane at right angles to the line of light. The lens is moved transversely, i.e. substantially at right angles to its optic axis. An image of the line of light is formed in an image plane and due to the travel of the lens, this image also moves. A constant frequency optical track, similar to either a variable area or a variable density sound track, preferably a pure sine wave reticle, is positioned in the image plane and is oriented parallel to the direction of the lens. It is customary to refer to an optical track of this type as a "sound" track, but since audible sound is not involved, the track itself will be referred to as an optical track or simply a track. The distance of the track from the test area is such that an acceptable ("perfect") lens in the test area forms an image of the light source, with maximum sharpness on the track. The width of the image is a small fraction of one cycle of the track so that the track serves to modulate the light beam transmitted through the track. However, the degree of modulation differs with the sharpness of the image. If the lens is out of focus or decentered or contains some flaw so that the image is wide, the modulation is much less. Theoretically there is zero modulation when the image has a width equal to ½ cycle of the track.

The mount for carrying the lens through the test area has an aperture centered with respect to the part of the mount which engages the centering control mounting surface of the lens unit. Also the track is at a fixed distance from the surface of the mount which engages the axial control mounting surface of the lens unit. Thus when the image forming surfaces of the lens unit are, for their particular focal length, at the wrong distance from the axial control mounting surface or are decentered relative to the centering control mounting surface, the image quality is less than acceptable.

A photoelectric cell picks up the light transmitted by the optical track and produces a modulated signal which is recitified (differentiated and clipped) and integrated. The integrated signal is quite large for a "perfect" lens but is much smaller for an inferior or out-of-focus lens. This signal is then used to trigger a sorting system so that it accepts lenses which give a signal greater than some preset value and rejects the others.

The lenses are preferably arranged on a continuous belt or the periphery of a rotating disk, and over an aperture in the belt or disk so that a succession of lenses may be fed through the test area. The belt or disk which constitutes the mount for the lenses in the tester engages the control surfaces of the lens, i.e. the surfaces which determine its location in a camera relative to the film plane and/or relative to the lens diaphragm.

In one embodiment of the invention one edge of each lens lies on a flipper spring member which is normally held down but which is released automatically at two positions in the path of the lens. One of these positions constituting the sorting area is at the edge of the test area. The sorter consists of means for holding the snap spring down as it passes this first release area whenever a highly modulated signal indicates that the lens is acceptable. If the lens is not acceptable, the flipper spring is released at this point and the rejected lens is tossed into a rejection bin. Perfect or acceptable lenses pass this first release point without being removed or tossed from the disk or belt. The acceptable lenses then proceed to the second release point where they are tossed into the accepted bin.

Other objects and advantages of the invention will be apparent from the following description when read in connection with the accompanying drawings, in which:

FIG. 1 is a cross section of a typical plastic lens which may be sorted by the present invention.

FIG. 2 is a perspective view, partly schematic of a preferred form of the present invention.

FIG. 3 is a cross section of one detail of the arrangements shown in FIG. 2.

FIG. 4 is an enlarged view of the optical sound track.

FIG. 5A is a block diagram of a preferred form of electronic circuits for use in the embodiment shown in FIG. 1.

Figure 6:
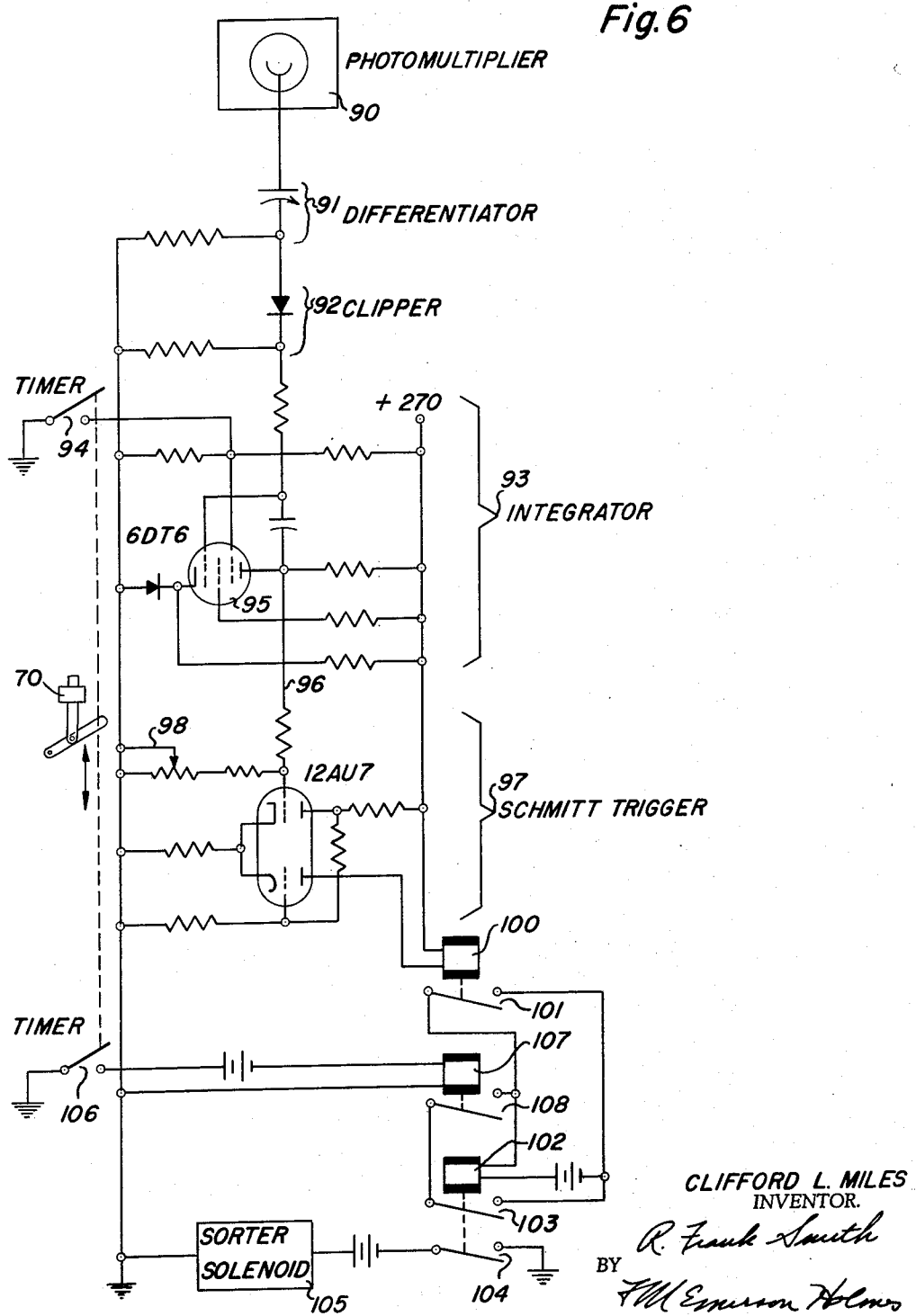

FIG. 5B schematically illustrates the signal at each step of the circuit.

FIG. 6 shows the details of the electronic circuit.

In FIG. 1, a lens 10 consists of light focusing surfaces 11 and 12 integrally molded with a mount which may be left clear or which may be suitably colored before mounting on the front of an inexpensive camera. The surface 13 herein referred to as the axial control mounting surface of the lens unit will engage a surface on the camera which is at a fixed distance from the film plane. Accordingly the lens should have a focal length which forms a sharp image on this focal plane. The camera will also include an aperture which will constitute the diaphragm or stop for the lens and the aperture is at a fixed axial distance from the surface on the camera which engages surface 13.

The surface 14 of the lens unit is herein referred to as the centering control mounting surface. The surface on the camera which is press-fitted to the surface 14 is concentric with the fixed or adjustable diaphragm in the camera and hence the surfaces 11 and 12 of the lens unit should be optically centered with respect to the centering control mounting surface 14.

In the present lens tester shown in FIGS. 2 and 3 the lenses are mounted so that the surfaces 13 and 14 engage an insert 22 as discussed below. The upper surface 25 of the insert 22 engages the axial control surface 13 of each lens placed thereon and the periphery 26 of the insert 22 engages the centering control surface 14. Light from a lamp 30 is concentrated by a condenser 31 on a reticle slit 32. A lens 10 placed on the insert 22 focuses an image of the slit 32 on a sine wave reticle or constant frequency optical track 35 which is located at a fixed distance from the surface 25 of the insert 22. The track 35 may be a variable area track as shown schematically and greatly enlarged in FIG. 4 or may be a variable density track. In any case the image 36 formed thereon when sharp is much narrower than one cycle of the track. The image when out of focus is broader and, as is well known in sound recording, it produces less signal. When it becomes approximately as broad as one cycle of the track, or broader, it produces no appreciable signal at all when scanning the track.

Light transmitted by the track 35 is condensed by lens 40 onto a photomultiplier tube or other form of photoelectric cell 41 whose output signal eventually controls the sorter.

The disk 20 with its inserts 22, is rotated by a motor 42 through suitable gears 43 and 44, on a bearing 45. Adjacent to each insert 22 on the disk 20 is a flipper spring 46 which, if it were released, would flip the lens off the mount. However all of the flipper springs are held down most of the time by the edges 51 of an inverted plate or cup 50. The plate 50 is fixed and does not rotate with the disk 20. However the edge of this plate 50 has two cut-away sections 52 and 53 in the rim 51 thereof, as best shown in FIG. 2. As the disk 20 rotates under the plate 50, each spring is released first at the point 52 and again at the point 53. Lenses are placed by the operator on the rotating disk at the point 54. If the lens is a reject, the spring under the lens will be released at the point 52 and the lens will be tossed into the reject bin 60. However, if the lens is acceptable as indicated by a high modulation signal from the photo cell 41, a bar 61 will be held down by means of a solenoid 62 while the lens is passing the release point 52 and this will hold the flipper spring 46 down at this point. The lens will then proceed on the mount until it reaches the point 53 where all springs are released and hence the lens will be tossed into the accept bin 63. It will be noted that the release point 52 and the holder bar 61 are located at a sorting area adjacent to the test area and that the lenses pass through the sorting area just as they leave the test area. Actually, as a lens is passing through the test area a light image scans the sound track. Until the next lens arrives in the test area, the sound track is dark and this is referred to as the "dark-time" in the cycle. A switching mechanism 70 operated by a lever 71 is closed during each dark time and for a moment at the start and end of each "scan-time" to eliminate the effect of initial and terminal signals and the switching mechanism 70 remains open during the rest of the scan time. This operation is provided by a roller 72 on the end of the lever 71 which is pivoted about the point 73. The roller 72 falls (is urged) into each hole 21 in the disk 20 and then rides down out of the hole closing the switching mechanism 70. The holes are equally spaced around the circumference of the disk and hence the timer switch may be located at any convenient place along the path of travel of the holes. The disk is rotated at a more or less constant speed so as to scan the sound track at some preselected speed, to insure a fairly uniform frequency of signal. This insures uniformly good amplification within the photoelectric circuit.

Each insert 22 (fitted into holes 21 in the disc 20) has an aperture 23 concentric with the rim 26 and located in the position corresponding to the lens diaphragm of the camera.

In FIG. 5A the signal from the photomultiplier tube or photoelectric cell suitably amplified is, as shown in FIG. 5B effectively zero during the dark-time and rising to a high modulation value during scan time. When a good lens is being scanned the signal is highly modulated and when an inferior or out-of-focus lens is being scanned the modulation is less. This signal is then differentiated by circuit 91 and clipped by circuit 92 or rectified, the form of the signal at each step being shown in FIG. 5B, for both good and bad lenses. The signal is then passed into an integrating circuit 93 which is inoperative whenever the timer switch 94 is closed by the switching mechanism 70, since this "shorts out" a tube 95 in the integrator 93. The switch 94 (and the switch 106 discussed below) are the same as the switch 70 in FIG. 2 and are closed when the latter switch is closed. Thus the integrating circuit 93 remains inactive until just after the scan time starts. It then integrates the signal, cutting off just before the dark time starts and the signal remains zero throughout the dark time. The integrated signal is then fed into a Schmitt trigger circuit 97. All of these circuits are well known and are described in such text books as "Pulse and Digital Circuits" by Millman and Taub, McGraw-Hill Book Company, 1957. The Schmitt trigger circuit has an adjustable trigger level and this is preset to distinguish between acceptable lenses and those whose image quality is below tolerance. The trigger level is shown by dotted line 80 in FIG. 5B. It will be noted that the integrated signal 81 for a good lens is greater than the trigger level. The integrated signal 82 for a bad lens is less than this preset level. The Schmitt trigger is such that it passes a signal to the output as indicated by the line 85 when the input signal reaches the trigger level at the point 83. Since the integrated signal 82 never reaches the trigger level, the Schmitt trigger is not turned on during the scan time of a bad lens. It will be noted that the timer switch as indicated by the lines 86 is in the "on" position throughout the dark time and enough of the scan time to eliminate the surge in modulated current at the beginning and end of the scan time. When the Schmitt trigger turns off due to the drop in the integrated signal, the effect of the trigger carries over momentarily and so overlaps slightly the closed time 86 of the timer. The remainder of FIGS. 5A and 5B will be described after the details shown in FIG. 6 are explained.

In FIG. 6 a signal from a photomultiplier 90 is fed through a differentiating circuit 91 and a clipping circuit 92 to an integrator circuit 93. Whenever the timer switch 94 is closed by the switching mechanism 70 the tube 95 is rendered inoperative and there is no signal in the output 96 of the integrator. However, when the switch 94 is open the integrator is operative and the integrated signal is fed through the output 96 to the Schmitt trigger. The level at which the Schmitt trigger 97 operates is controlled by adjusting an adjustable resistance 98. When the Schmitt trigger does operate, it delivers a signal to the solenoid 100 which closes the switch 101 which in turn operates the solenoid 102. This closes the switches 103 and 104. This operates the sorter solenoid 105 but the sorting time has not yet arrived since the Schmitt trigger is operating during the scan time. At the end of the scan time the Schmitt trigger becomes inoperative but the switch 101 stays closed momentarily, due to inertia and at least long enough to overlap the closing of switch 108 discussed below. That is, if switch 101 is closed by the Schmitt trigger system, it does not open before the switch 101 is closed by the cycling timer 106 and solenoid 107.

Another timer switch 106 is closed by the switching mechanism 70 which energizes the solenoid 107 and this in turn closes the switch 108 in the relay memory system. Since the Schmitt trigger via solenoid 100 and 102 has closed switch 103, the closing of switch 108 holds solenoid 102 energized and remains closed as long as solenoid 107 is energized even though solenoid 100 has become de-energized.

In this condition with the switches 108, 103 and 104 all closed the sorter solenoid 105 holds the bar 61 down as the lens under test arrives in the sorter position. Accordingly this test lens, having produced sufficient signal to operate the Schmitt trigger is not ejected at the sort point but remains on the disk and travels to the accept point 53.

Going back now to FIGS. 5A and 5B it is noted that the output of the relay memory depends on whether a good lens or a bad lens has been scanned. Since we do not know whether the previous lens at the point 115 was a good lens or a bad lens alternative conditions of the relay memory are shown by lines 116. However when the Schmitt trigger operates at the point 85 (i.e. energizing solenoid 100), the relay memory moves to the condition indicated by level 117. This is the condition when the switches 101, 103 and 104 are all closed, particularly the switch 104. When the Schmitt trigger drops from the condition 85 (in which it energized solenoid 100), to the "no-signal" condition, switch 101 opens but switch 106 closes first as indicated by the line 86, which closes the switch 108 and keeps the switch 104 in the condition indicated by level 117. Even when the switch 106 opens at the start of a scan time, the solenoid 102 stays energized for a short time and the switch 104 stays closed momentarily as indicated by the dotted line 118. In fact, in practice, the apparatus is set up so that this time lag is sufficient to keep the switch from chattering, i.e. to keep the switch on, as long as the Schmitt trigger signals keep arriving on schedule as they do when all of the lenses are acceptable. However, when an unacceptable lens comes along the opening of the switch 106 and the failure of the Schmitt trigger to deliver any signal to the solenoid 100 causes the solenoid 102 to become de-energized and switches 103 and 104 to open as indicated by the level 119 in FIG. 5B. The lenses arrive at the sorting area and pass through the area during that part of the cycle 121 labeled sort time. When the switch 104 is closed during the sort time, as indicated by level 117 the sorter solenoid holds the clamp bar 61 down and lenses are not rejected. When the switch 104 is open during the sort time as indicated by the level 119, the clamp bar 61 is set up and the flipper springs reach the release point 52 flipping the rejected lens into the bin 60.

If anything should happen to the electronic circuit so that no signals are transmitted, the solenoid 62 will not be energized during sort time and all lenses will be rejected. Thus the system is a "fail-safe" one, never passing lenses as good, when the sorter fails by failure of the electronic circuit.

For the sake of clarity the overall operation will be outlined chronologically repeating only the main features discussed above and using the terminology as defined above. All reference to the anti-chatter feature, the "fail-safe" feature and to the ability to control selectivity by adjusting the trigger level of the system, all as discussed above, will be omitted from this basic outline.

Each lens in the sequence is subjected to a scan time and then to a dark time in the cycle. If it is a bad lens, it is ejected (to bin 60) at the end of this dark time or just at the beginning of the next scan time. If it is a good lens it remains on the rotating disc without reference to the cycle of scan and dark times, until it reaches the eject point 53 at which all lenses still in the disc are ejected into the bin 63.

The switching mechanism 70 moves to the open position shortly after the start of the scan time and moves to the closed position shortly before the end of the scan time. Switches 94 and 106 are opened and closed simultaneously by the switching mechanism 70.

A good lens provides a large A.C. signal which is integrated to a large D.C. value crossing the trigger level as indicated at 83. This in turn causes the Schmitt trigger to energize the solenoid 100 during the latter part of scan time for that good lens.

A bad lens fails to deliver as high an A.C. signal and this small signal when integrated does not cross the trigger level and hence the Schmitt trigger fails to energize the solenoid 100.

Thus a good lens closes the switch 101 and a bad lens fails to close the switch 101 during scanning time.

When 101 is closed it energizes solenoid 102 which closes switches 103 and 104. At the end of the scan period, switch 101 opens, but not before switch 108 has been closed by solenoid 107 energized by the closing of switch 106.

Now since both switches 103 and 108 are closed at the moment switch 101 opens, solenoid 102 stays energized through closed switches 103 and 108. Thus at the end of the scan time for a good lens, the closing of the switch 106 holds the switches 103 and 104 closed and continues to hold them closed until the switch 106 is opened at the beginning of the next scan time.

As long as the switch 104 is closed the lenses, which are good lenses are not ejected into the bin 60.

However, in the case of a bad lens, switch 101 has not been closed and hence switch 103 has not been closed so that closing of the switches 106 and 108 cannot energize the solenoid 102 (the switch 103 being open) hence the switch 104 is open and remains open from the beginning of the scan time of the bad lens through the scan time and the dark time and at least the first part of the next scan time.

With the switch 104 open, the solenoid 105 is not energized and the bar 61 of FIG. 2 is not pulled down. Thus the flipper springs are free to snap into the recess 52, flipping the bad lens off the disc into the reject bin 60.

I claim:

1. The method of sorting lenses according to their image producing quality which comprises forming by a lens to be tested, a narrow line light image, moving the lens transversely in a direction substantially at right angles to its optic axis and substantially at right angles to the line image to move the line image along a constant frequency optical track, each cycle of which is wider than said line image when sharply focused, converting the light transmitted by the track to a modulated electric signal and feeding the modulated signal to a sorter which rejects the lenses when the modulation of the signal is below a tolerance value and accepts lenses when said modulation is above this value.

2. The method according to claim 1, in which the step of moving includes placing a succession of lenses over apertures in a moving support which apertures correspond to the lens diaphragms and which support carries the lens in succession through a test area in front of a line source of light to be focused to said image and through the sorter.

3. A lens tester and sorter comprising means, including apertures corresponding to the lens diaphragms, for supporting a succession of lenses to be tested with each lens aligned with an aperture, and for moving them through a test area in a direction substantially transverse to the optic axes of the lenses, a line source of light effectively at right angles to the direction of travel of the lenses through the test area and positioned to illuminate said area and to send light through each lens when in the test area, a constant frequency optical track positioned to receive light from each such lens and to transmit it, the track being at the distance from the area which is optically conjugate to the line source for an acceptable lens and being oriented parallel to said direction of travel whereby an acceptable lens in the test area forms a sharp line image of the source on the track and the travel of the lens causes the image to scan the track, photoelectric means for receiving light transmitted and modulated by the track and means controlled by the photoelectric means for sorting the lens accepting only those producing a signal from the photoelectric means modulated more than a preset value.

4. A lens tester and sorter according to claim 3 in which the lens supporting means is a rotating disc with apertures spaced along a circle near the periphery, said means including a flipper spring adjacent to each aperture with the moving end of the spring located to engage the periphery of a test lens when over the aperture, cam means for holding the flipper springs down except at two points at which a flip of the spring removes a lens from the disc, one point being at the sort area just as the lens leaves the test area and the other at an accept area further along the path of travel of the lenses and electromagnetic means operated by a signal modulated more than said preset value, for holding the spring down at the sort area when an acceptable lens moves into the sort area from the test area, whereby unacceptable lenses are removed at the sort area and acceptable lenses continue to the accept area where they are removed.

5. A lens tester for sorting lenses according to three criteria affecting image quality in an image plane, focal length of the lens measured from an axial control mounting surface on the lens unit, optical centering of the lens relative to a centering control surface on the lens unit and, flaws in and aberrations due to, the light focusing surfaces of the lens unit, which lens tester comprises an apertured mount for holding a succession of lenses to be tested with the centering control surfaces of each lens centered over an aperture in the mount and with the axial control surface axially spaced from the aperture the distance it would be from the lens diaphragm in an acceptable lens, means for moving said mount to move the succession of lenses substantially transverse to their optic axes through a test area, a line source of light for illuminating the test area and oriented at right angles to the direction of travel of the lenses through the test area, a constant frequency sine wave optical track positioned to receive light through a lens in the test area and to transmit it, the track being oriented parallel to said direction of travel and being at the distance from the test area and mount, which is optically conjugate to the line source for an acceptable lens in the lens area and mounted on the mount with its centering control surface so centered on the aperture and its axial control surface so spaced from the aperture, whereby an acceptable lens in the test area forms a sharp line image of the source on the track and the travel of the lens causes the image to scan the track, photoelectric means for receiving light transmitted and modulated by the track and means controlled by the photoelectric means for sorting the lenses accepting only those producing a signal from the photoelectric means modulated more than a preset value.

References Cited in the file of this patent

UNITED STATES PATENTS

| | | |
|---|---|---|
| 2,100,227 | Stoate et al. | Nov. 23, 1937 |
| 2,267,961 | Tillyer et al. | Dec. 30, 1941 |
| 2,355,092 | Meister | Aug. 8, 1944 |